(12) United States Patent
Kolze (10) Patent No.: US 8,873,672 B2
(45) Date of Patent: Oct. 28, 2014

(54) CONCATENATED CODING SCHEME FOR BURST NOISE AND AWGN FOR MULTI-CHANNEL APPLICATIONS

(71) Applicant: Broadcom Corporation, Irvine, CA (US)

(72) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/848,185

(22) Filed: Mar. 21, 2013

(65) Prior Publication Data

US 2013/0251063 A1 Sep. 26, 2013

Related U.S. Application Data

(60) Provisional application No. 61/613,965, filed on Mar. 21, 2012.

(51) Int. Cl.
*H04L 27/00* (2006.01)
*H04L 1/00* (2006.01)

(52) U.S. Cl.
CPC ............ *H04L 1/0041* (2013.01); *H04L 1/0065* (2013.01); *H04L 1/0071* (2013.01)
USPC ............................... 375/295; 341/20; 341/173

(58) Field of Classification Search
CPC .... H04L 1/0065; H04L 1/0041; H04L 1/0071
USPC ....................................................... 375/295
See application file for complete search history.

(56) References Cited

U.S. PATENT DOCUMENTS

| 7,853,855 | B1* | 12/2010 | He | 714/755 |
| 2004/0066738 | A1* | 4/2004 | Stopler | 370/206 |
| 2011/0206021 | A9* | 8/2011 | Hansen et al. | 370/338 |
| 2013/0028336 | A1* | 1/2013 | Limberg | 375/240.27 |

* cited by examiner

*Primary Examiner* — Erin File
(74) *Attorney, Agent, or Firm* — Garlick & Markison; Shayne X. Short (57) ABSTRACT

Concatenated coding scheme for burst noise and AWGN for multi-channel applications. An appropriately selected and relatively powerful error correction code (ECC) or forward error correction (FEC) code is used as an inner code to cover two or more respective channels that have respectively undergone processing in accordance with an outer code. An input signal stream may undergo partitioning into a number of respective channels (e.g., sub-carriers of orthogonal frequency division multiplexing (OFDM) signaling (or different respective blocks or groups of OFDM subcarriers), different respective spreading codes of code division multiple access (CDMA) modulation, etc., or elements of any type of orthogonal signaling scheme) such that those respective channels undergo outer code processing to generate a number of coded signals, and subsequent inner code processing covers two or more of those respective coded signals. Such outer code processing may cover all of the coded signals provided by the inner code processing.

20 Claims, 7 Drawing Sheets

CONCATENATED CODING SCHEME FOR BURST NOISE AND AWGN FOR MULTI-CHANNEL APPLICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/613,965, entitled "Concatenated coding scheme for burst noise and AWGN for multi-channel applications," filed Mar. 21, 2012.

BACKGROUND OF THE INVENTION

1. Technical Field of the Invention

The invention relates generally to communication systems; and, more particularly, it relates to communication systems which may deleteriously incur and/or suffer from burst noise events.

2. Description of Related Art

Data communication systems have been under continual development for many years. One such type of communication system that has been of significant interest lately is a communication system that employs iterative error correction codes (ECCs) and/or forward error correction (FEC) codes. Also, communications systems with iterative codes are often able to achieve lower bit error rates (BER) than alternative codes for a given signal to noise ratio (SNR).

A continual and primary directive in this area of development has been to try continually to lower the SNR required to achieve a given BER within a communication system. The ideal goal has been to try to reach Shannon's limit in a communication channel. Shannon's limit may be viewed as being the data rate to be used in a communication channel, having a particular SNR, that achieves error free transmission through the communication channel. In other words, the Shannon limit is the theoretical bound for channel capacity for a given modulation and code rate.

Generally speaking, within the context of communication systems including those that may employ ECCs and/or FECs, there is a first communication device at one end of a communication channel with encoder capability and second communication device at the other end of the communication channel with decoder capability. In many instances, one or both of these two communication devices includes encoder and decoder capability (e.g., within a bi-directional communication system). Such ECCs codes can be applied in a variety of additional applications as well, including those that employ some form of data storage (e.g., hard disk drive (HDD) applications and other memory storage devices) in which data is encoded before writing to the storage media, and then the data is decoded after being read/retrieved from the storage media.

DETAILED DESCRIPTION OF THE INVENTION

Figure 1:
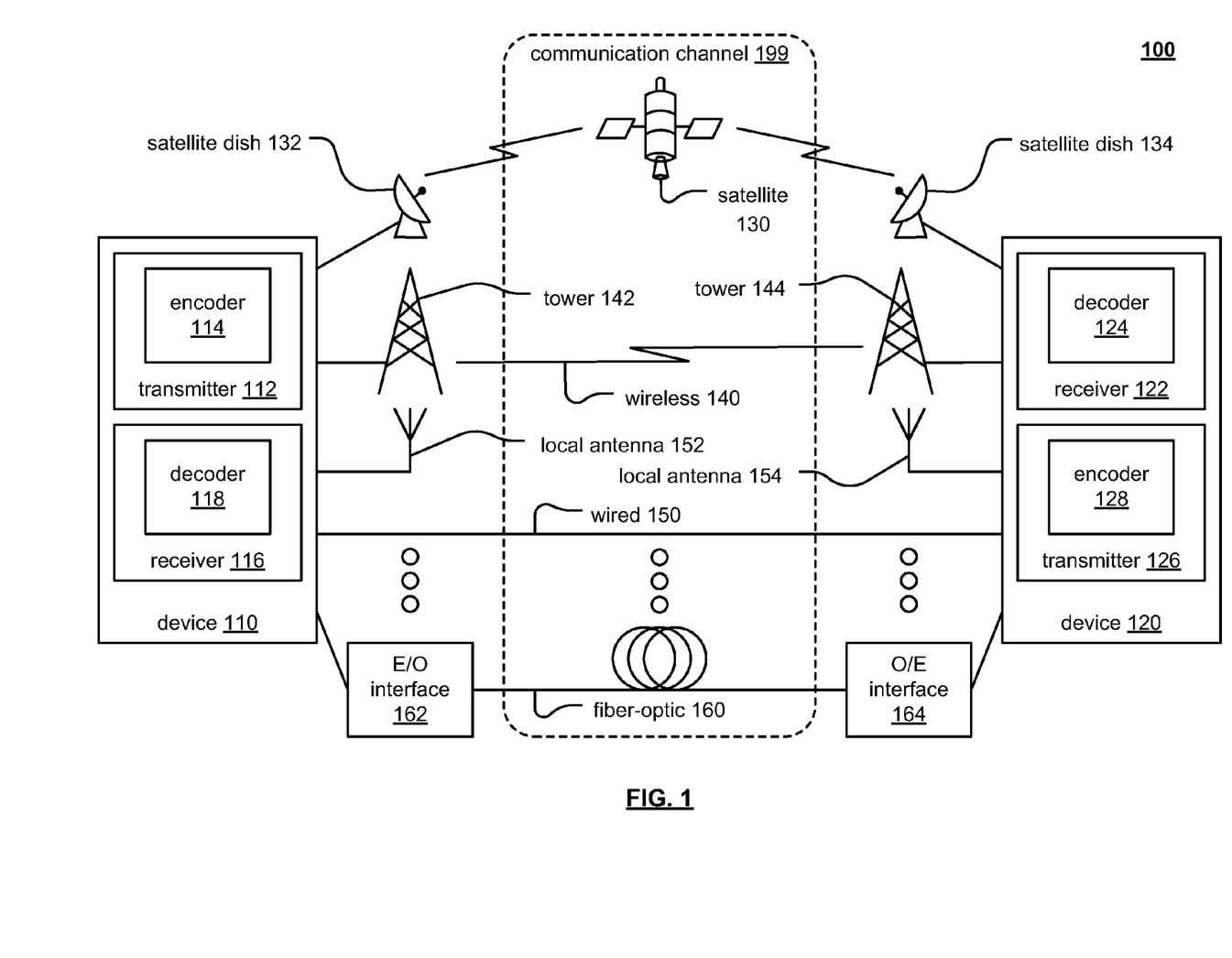
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
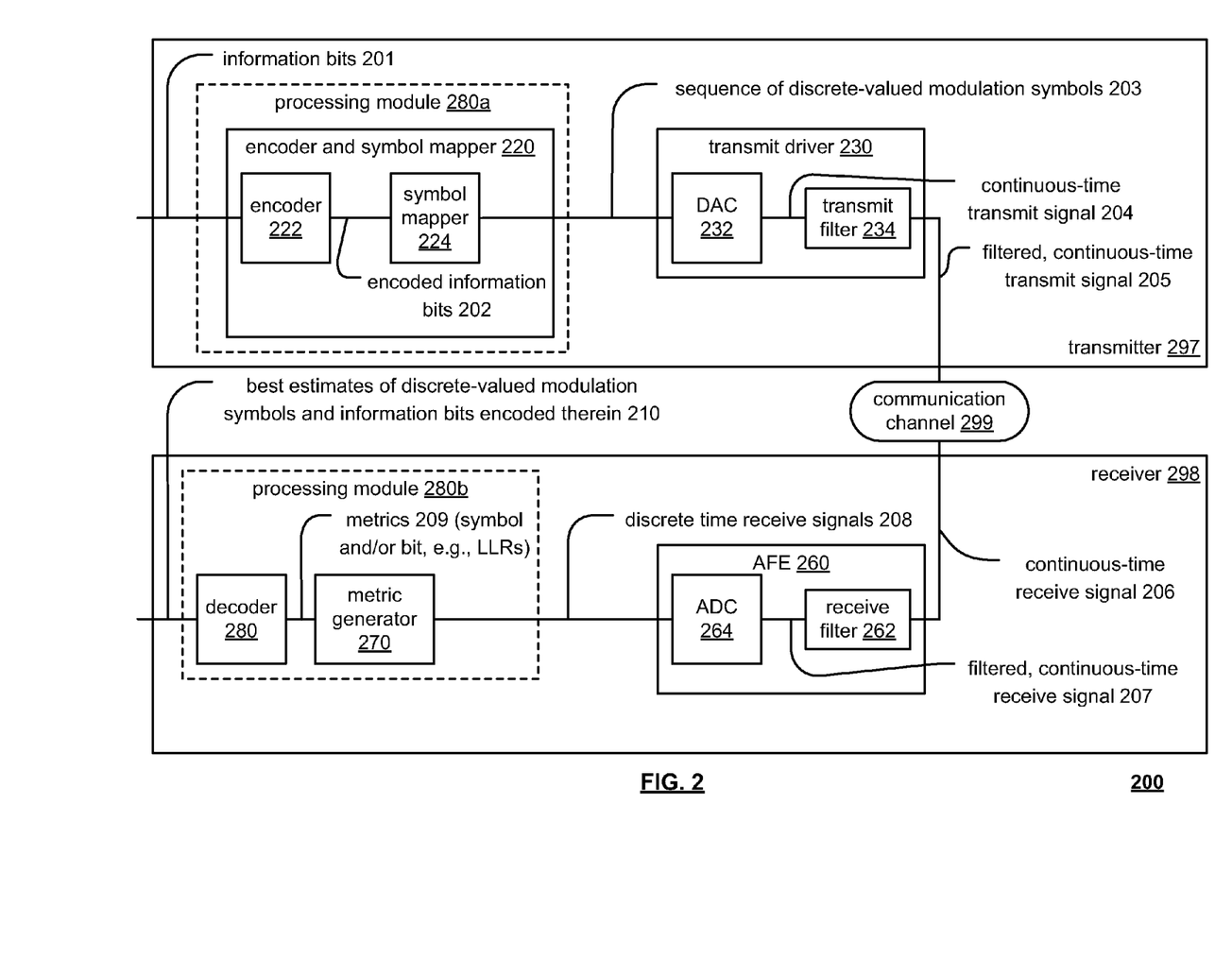

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
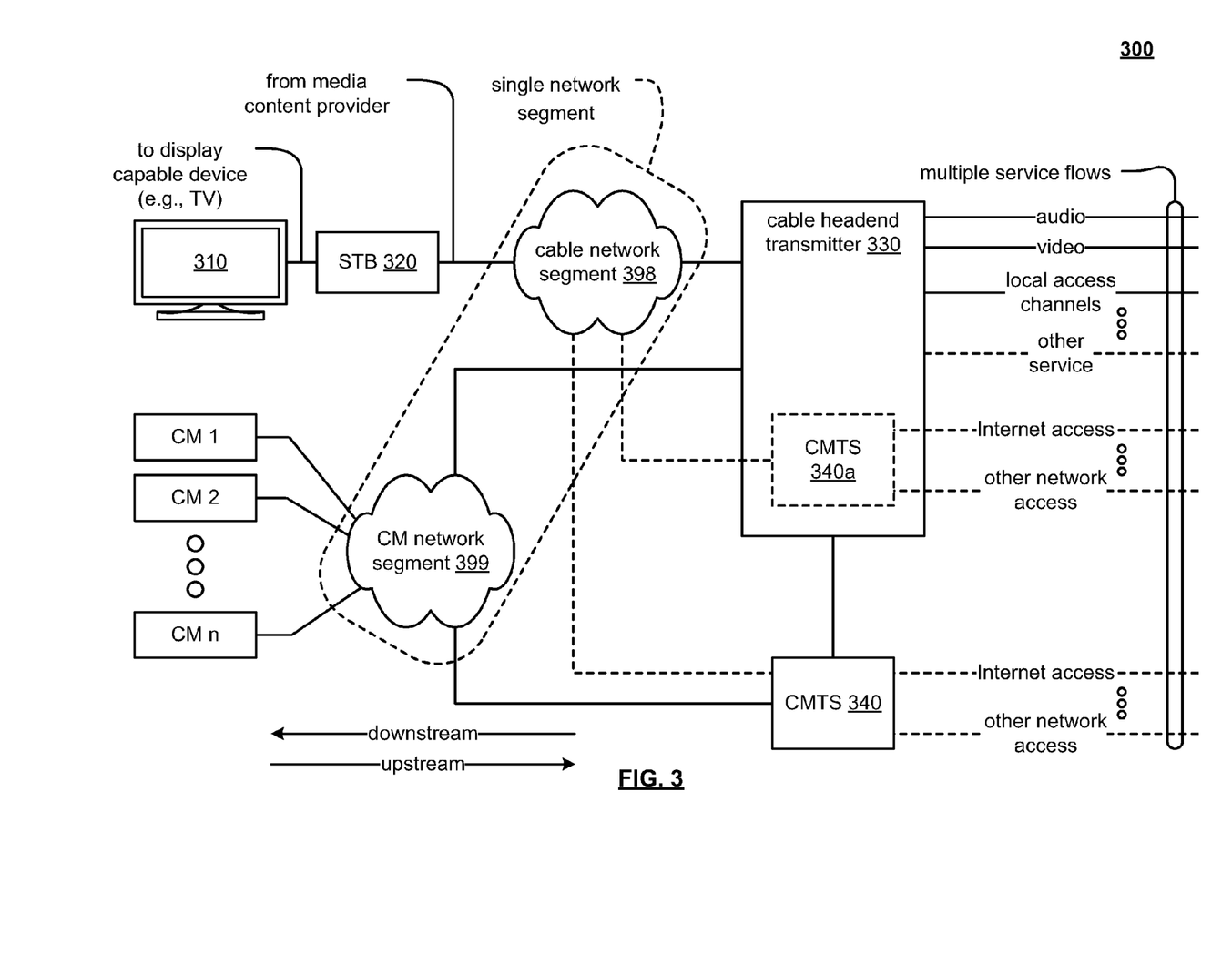

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting-Second Generation Cable) standard, DVB-T2 (Digital Video Broadcasting-Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340*a* may also be coupled to the cable network segment 398, as the STB 320 may itself include cable modem functionality therein.

It is also noted that any one of the cable modems 1, 2, . . . *m n*, the cable headend transmitter 330, the CMTS 340 or 340*a*, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Combined burst events and AWGN present challenges to communications systems. Set-partitioned coded modulation (SPCM) has proven to be useful in communications involving high density constellations, such as band-limited channels (e.g., bandwidth, channel, etc. limited channels) where a large number of information bits per symbol are required to be communicated. In modulation schemes such as orthogonal frequency division multiplexing (OFDM) and multi-carrier quadrature amplitude modulation (QAM), an allocated spectrum may be occupied with multiple tones or carriers transmitting information from a modem.

Herein, set-partitioned coded modulation is applied, with inner code for the "coded bits" of the SPCM provided, and also with an outer code for covering the "uncoded bits" of the SPCM. The inner code is long and chosen robust enough to survive the burst event (possibly with the aid of a burst event detector at the receiver, enabled to accurate performance due to the multiplicity of simultaneous channels operating into the receiver). However, during the burst events many of the "uncoded bits" will incur errors, thus requiring a stronger-than-usual outer code for the SPCM, and also benefiting from an outer code which can beneficially use erasure information (from knowledge of the burst event at the receiver as just described), and perhaps from the inner decoder metrics. Finally, in order to further mitigate the burst event for both the inner code and the outer code, interleaving is applied.

A novel approach is presented herein for the association of each outer encoder with its interleaver and modulator, but providing inner coding which operates on bits from multiple such outer encoders and passes its bits to multiple such interleavers and modulators. In accordance with any one or more of the various aspects, embodiments, and/or their equivalents, of the invention, a novel approach is presented herein for providing outer coding for bits that will remain associated with a particular channel, through its interleaver and modulation, but provides inner coding across bits which pass through a multiplicity of outer encoders, and route to different interleavers and modulators.

Figure 4:
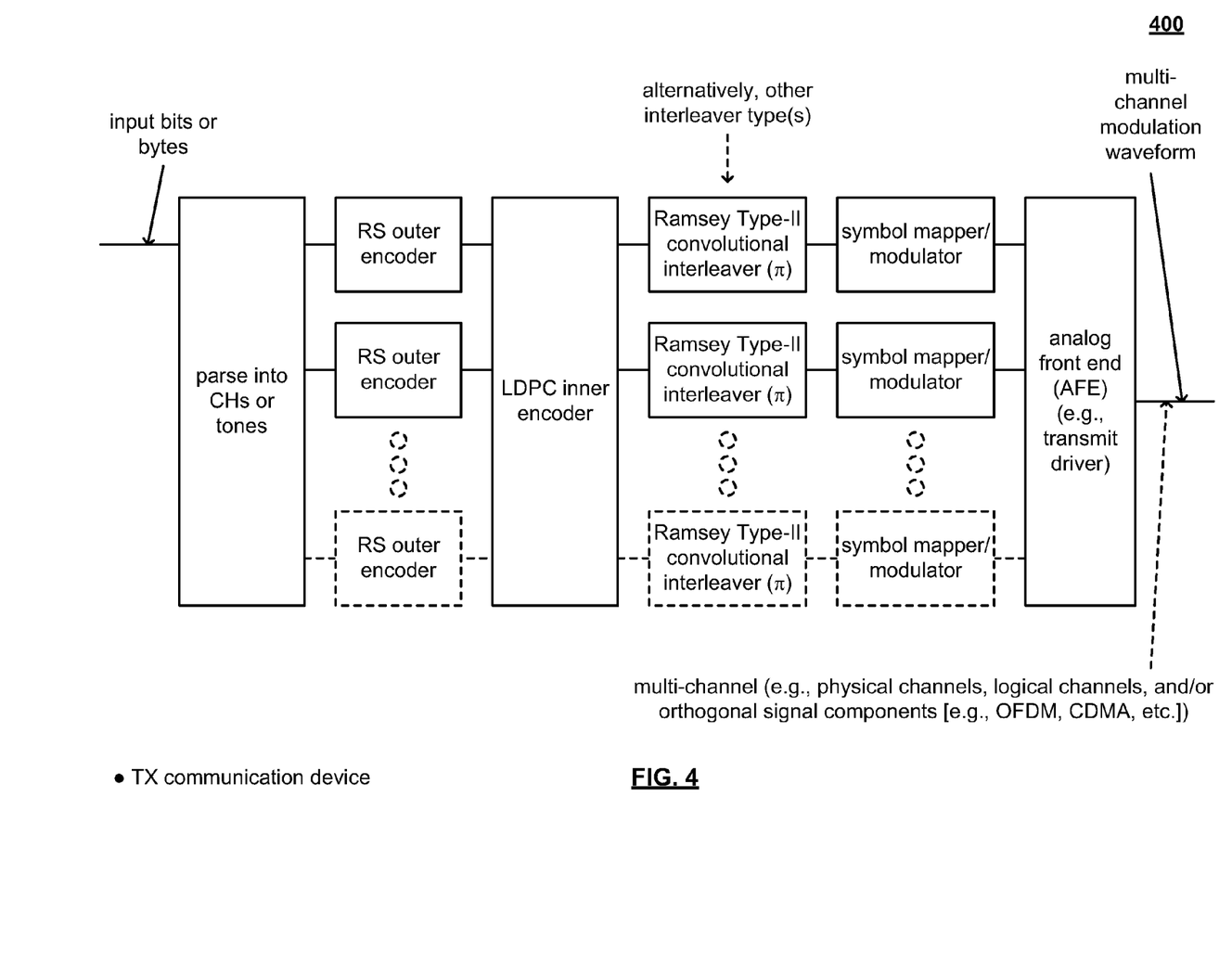
FIG. 4 illustrates an embodiment of a concatenated coding scheme for burst events and additive white Gaussian noise (AWGN) (e.g., such as may be implemented in a transmitter (TX) device).

FIG. 4 illustrates an embodiment 400 of a concatenated coding scheme for burst events and additive white Gaussian noise (AWGN) (e.g., such as may be implemented in a transmitter (TX) device). As may be seen with respect to this diagram, a signal undergoes partitioning or parsing (e.g., using a parser) into a number of respective input bits or bytes. A plurality of outer encoders (e.g., Reed-Solomon (RS), BCH (Bose and Ray-Chaudhuri, and Hocquenghem), and/or any other appropriately selected one or more codes) respectively process a plurality of parsed groups of the plurality of input bits or bytes to generate a plurality of coded signals, respectively. As may be seen with respect to the connectivity within the diagram, a first and a second of the plurality of coded signals generated by a respective first and a second of the plurality of outer encoders, and so on for implementations including more than two respective outer encoders.

Then, an inner encoder (e.g., using low density parity check (LDPC) coding, and/or any other appropriately selected one or more codes) is implemented to process at least a subset of the plurality of coded signals to generate at least one codeword, wherein the subset of the plurality of coded signals selected based on a duration of a burst noise event associated with at least one of a plurality of channels via which the apparatus to communicate with at least one additional apparatus. That is to say, such a device or apparatus operates to cover two or more of the respective outputs from the outer encoders. In some instances, a singular inner encoder operates to cover all of the respective outputs from the outer encoders. In other embodiments, more than one respective inner encoder may be implemented to process, respectively, a first group of outputs from a first group of outer encoders, a second group of outputs from a second group of outer encoders, etc.

Then, a plurality of interleavers are implemented to process the at least one codeword to generate a plurality of interleaved signals. A number of symbol mappers or modulators are also implemented to process the plurality of interleaved signals to generate a plurality of modulated signals. Such a device may also include an analog front end (AFE) and/or transmit driver to generate a multi-channel modulation waveform based on the plurality of modulated signals. The device then may support, via at least one communication interface, communication with the at least one additional apparatus via at least one of the plurality of channels.

As may be understood with respect to this diagram, there are multiple, separate and distinct outer encoders to separate the processing into respective channels. By using appropriately selected long inner code (e.g., the inner code has relatively more bits than any of the outer codes), the relatively long inner code may be used to cover two or more of the respective outputs from the inner encoders. Again, in certain embodiments, a singular inner encoder operates to cover all of the outputs from all of the respective inner encoders. As the reader will understand, a relatively longer LDPC code comes closer to Shannon's limit than a relatively shorter LDPC code).

As such, by employing an appropriately selected inner code, the outer code does not need to come as close to Shannon's limit. In certain embodiments, the error correction capability of the inner code need only be effective at soft decision metric processing. Such an appropriately designed architecture operates to optimize or minimize the complexity of device (e.g., optimize or minimize the complexity of a decoder by using this architecture of the encoder scheme). Generally speaking, a relatively very long, higher complexity inner code may be viewed as accompanying with and covering a relatively lower complexity outer code.

Moreover, it is noted that any appropriately selected code may be employed for either the inner or outer codes. For example, with respect to the outer code, a designer may appropriately select one or more of Reed-Solomon (RS), BCH (Bose and Ray-Chaudhuri, and Hocquenghem) code, turbo code, and/or any one or more other appropriately selected codes. In certain embodiments, a primary selection criterion for the inner code is directed toward selecting a code that can handle soft decisions effectively. Generally speaking, the use of an effective and powerful inner code, such as a relatively long length LDPC code for the inner code, may better assist in the ultimate goal to reach Shannon's limit.

Also, the reader will understand that if a given embodiment were to use a different LDPC encoder for each of the respective channels, if same lengths of codewords, then that codeword would spend a lot of time in the channel. The reader will also understand that such operation will introduce an undesirable amount of latency. However, using the novel architecture presented herein will provide for the benefit of using a relatively long LDPC codeword, and the combined architecture will also allow for effective control of latency because that LDPC encoder shares multiple channels.

As a system design consideration, a certain design consideration may be directed towards looking at a worst-case type of or expected burst event that the device may need to tolerate. For example, it may be preferential that a given signal will spend a sufficiently long period of time within the channel, if that burst event is across multiple channels. For example, an appropriately selected LDPC code may be selected to be some multiples of length of the worst-case type of or expected burst event.

Consideration of this and other factors will direct a designer to select how many channels to spread the codeword across. For example, if a relatively too few number of channels are selected (e.g., which would be better for latency), there may be sufficient error correcting capability to accommodate correction of such burst events across those channels. The novel and combined architecture presented herein allows for a reduction in latency in each individual channel. Appropriate selection of the degree that the LDPC code is shared may be some multiple of the burst event. Also, in those embodiments that include two or more respective interleavers interposed in between the inner encoder(s) and the two or more symbol mappers/modulators or two or more respective de-interleavers interposed in between the two or more symbol demappers/demodulators and the inner decoder(s) should be considered along these lines as well.

Again, it is noted that a given implementation of such a device may include two or more respective inner encoders and decoders (e.g., two or more respective LDPC inner encoders and decoders). For example, anyone of those respective devices may be shared across more than one channel. As an example, a first LDPC inner encoder may operate to service channels 1 though x, a second LDPC inner encoder may operate the service channels x through y, and so on. Of course, certain embodiments will operate such that a single inner encoder will service all of the channels. Then, an appropriately selected outer code (e.g., RS, BCH, etc.) may operate in conjunction with the appropriately selected one or more inner encoders. In some embodiments, such in appropriately selected outer code is made based upon its ability to handle burst events, soft decisions, etc.

It is noted that, with respect to reference to a channel, each of the respective channels may in fact be different physical communication channels. Alternatively, the channels may be viewed as being logical channels such as in accordance with some subdivision of one or more physical channels. In even another embodiment, the respective channels may correspond to different respective subcarriers in accordance with orthogonal frequency division multiplexing (OFDM) signaling (or different respective blocks or groups of OFDM subcarriers), or different respective spreading codes in accordance with code division multiple access (CDMA) modulation, etc. Any variety and/or combination of any type of orthogonal signaling scheme may be implemented to service multiple respective channels.

Figure 5:
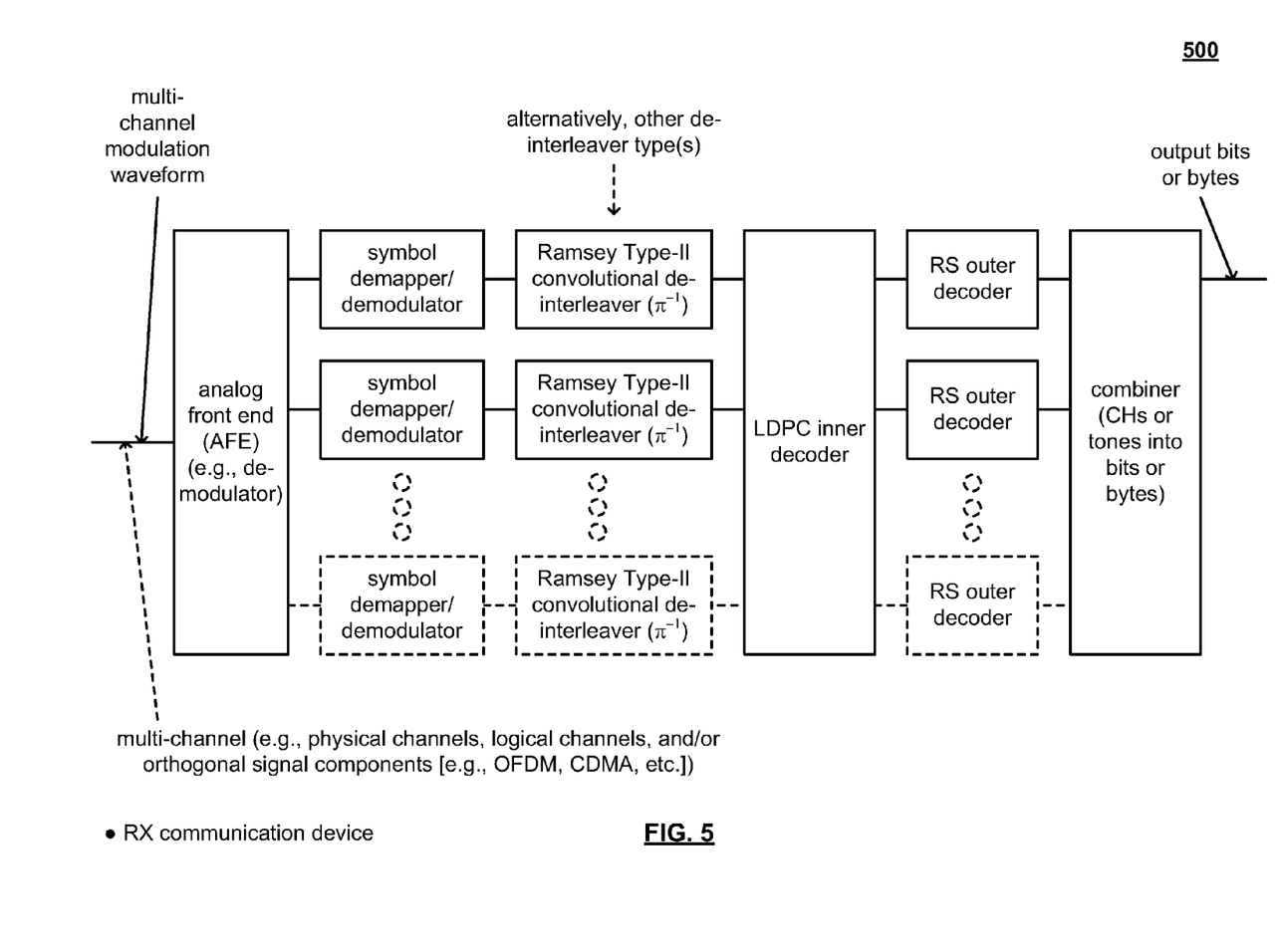
FIG. 5 illustrates an alternative embodiment of a concatenated coding scheme for burst events and additive white Gaussian noise (AWGN) (e.g., such as may be implemented in a receiver (RX) device).

FIG. 5 illustrates an alternative embodiment 500 of a concatenated coding scheme for burst events and additive white Gaussian noise (AWGN) (e.g., such as may be implemented in a receiver (RX) device). The reader will understand the reverse operation performed within this diagram and relative comparison to the prior diagram. For example, demodulation, symbol the mapping, the interleaving, inner decoding, outer decoding, and combining are all correspondingly performed within a receiver type device to comport with the operation performed within a transmitter type device.

Figure 6:
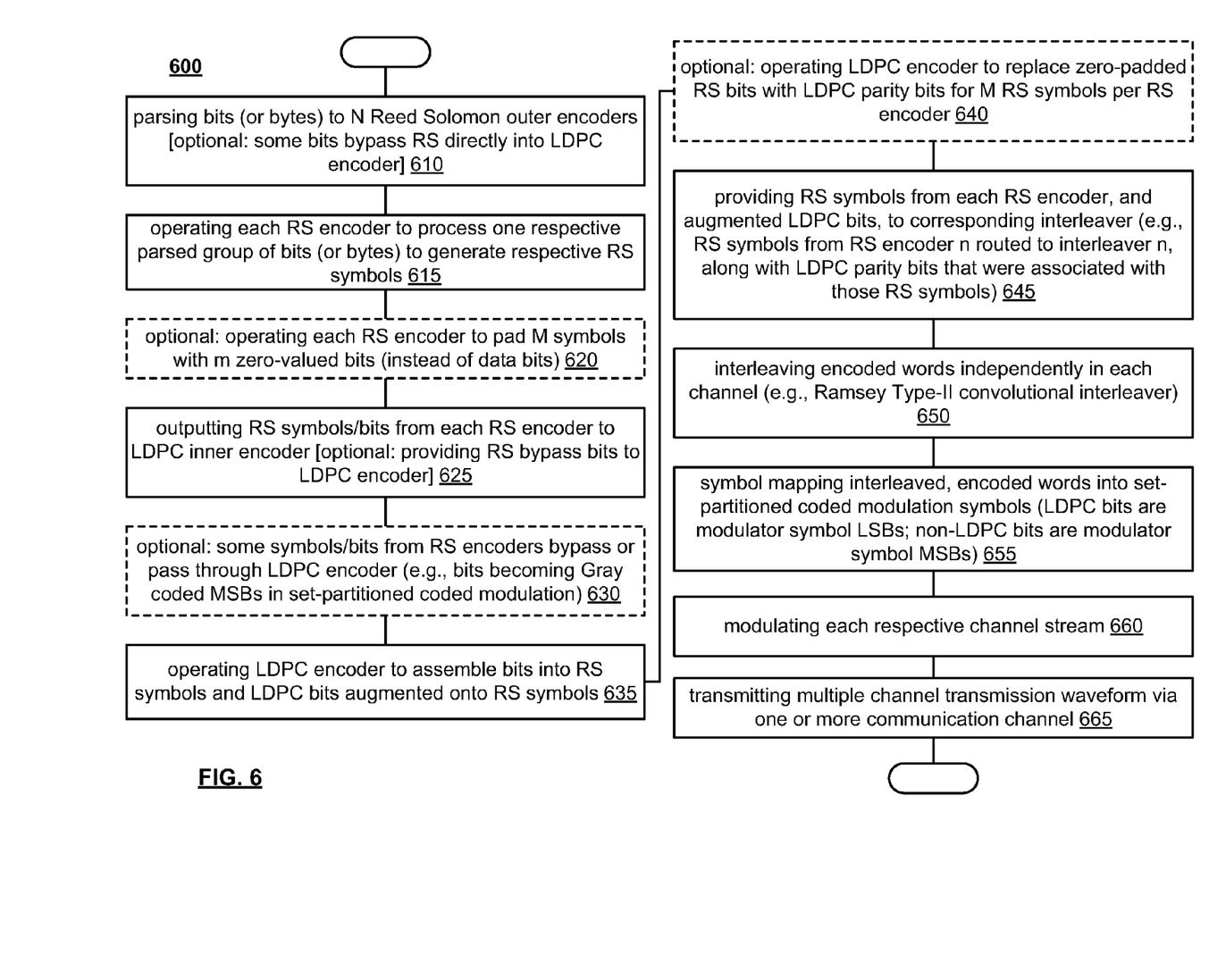
FIG. 6 and FIG. 7 illustrate various embodiments of methods for operating one or more communication devices.
Figure 7:
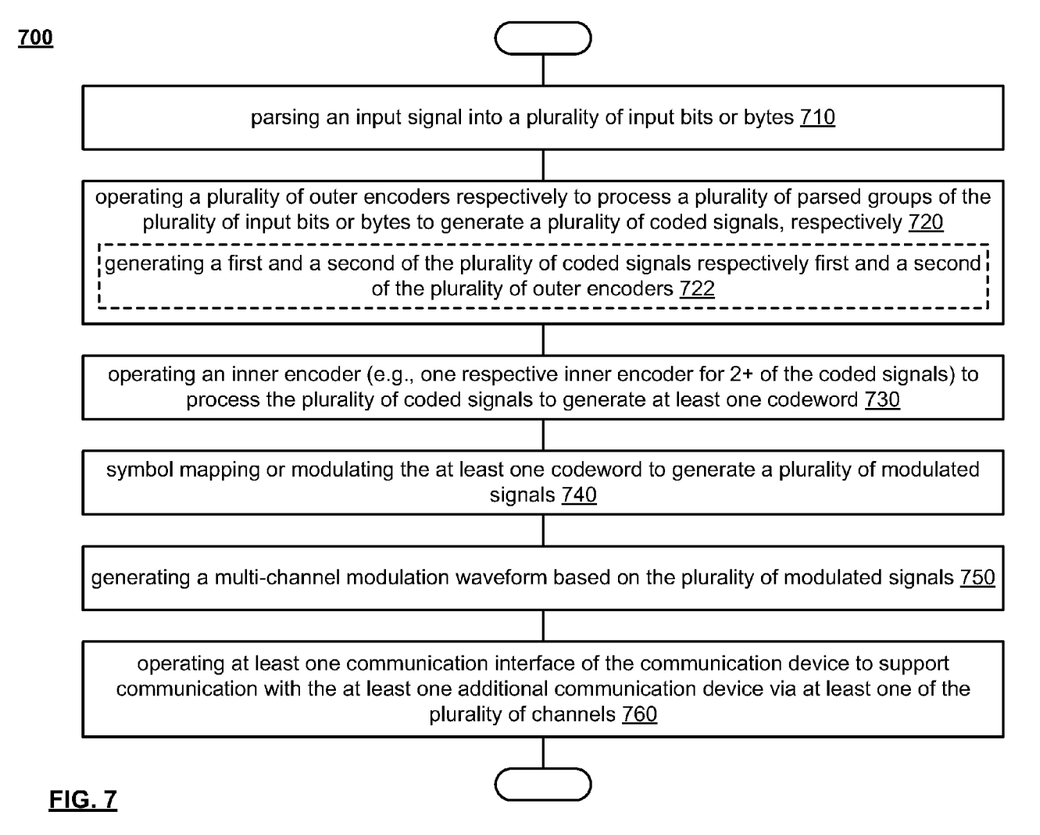

FIG. 6 and FIG. 7 illustrate various embodiments of methods for operating one or more communication devices.

Referring to method 600 of FIG. 6, the method 600 begins by parsing bits (or bytes) to N Reed Solomon outer encoders [optionally, the method also operates such that some bits bypass RS directly into LDPC encoder], as shown in a block 610. The method 600 then operates by operating each RS encoder to process one respective parsed group of bits (or bytes) to generate respective RS symbols, as shown in a block 615.

The method 600 optionally continues by optionally operating each RS encoder to pad M symbols with m zero-valued bits (instead of data bits), as shown in a block 620.

The method 600 continues by outputting RS symbols/bits from each RS encoder to LDPC inner encoder [optionally, the method also operates by providing RS bypass bits to LDPC encoder], as shown in a block 625.

The method 600 then optionally operates by optionally some symbols/bits from RS encoders bypass or pass through LDPC encoder (e.g., bits becoming Gray coded MSBs in set-partitioned coded modulation), as shown in a block 630.

The method 600 then operates by operating LDPC encoder to assemble bits into RS symbols and LDPC bits augmented onto RS symbols, as shown in a block 635.

The method 600 continues optionally by optionally operating LDPC encoder to replace zero-padded RS bits with LDPC parity bits for M RS symbols per RS encoder, as shown in a block 640.

The method 600 then operates by providing RS symbols from each RS encoder, and augmented LDPC bits, to corresponding interleaver (e.g., RS symbols from RS encoder n routed to interleaver n, along with LDPC parity bits that were associated with those RS symbols), as shown in a block 645. The method 600 continues by interleaving encoded words independently in each channel (e.g., Ramsey Type-II convolutional interleaver), as shown in a block 650.

The method 600 then operates by symbol mapping interleaved, encoded words into set-partitioned coded modulation symbols (LDPC bits are modulator symbol LSBs; non-LDPC bits are modulator symbol MSBs), as shown in a block 655. The method 600 continues by modulating each respective channel stream, as shown in a block 660. The method 600 then operates by transmitting multiple channel transmission waveform via one or more communication channel, as shown in a block 665.

Referring to method 700 of FIG. 7, the method 700 begins by parsing an input signal into a plurality of input bits or bytes, as shown in a block 710. The method 700 continues by operating a plurality of outer encoders respectively to process a plurality of parsed groups of the plurality of input bits or bytes to generate a plurality of coded signals, respectively, as shown in a block 720. In certain embodiments and/or from certain perspectives, the method 700 also operates by generating a first and a second of the plurality of coded signals respectively first and a second of the plurality of outer encoders, as shown in a block 722.

The method 700 then operates by operating an inner encoder (e.g., one respective inner encoder for 2+ of the coded signals) to process the plurality of coded signals to generate at least one codeword, as shown in a block 730. The method 700 continues by symbol mapping or modulating the at least one codeword to generate a plurality of modulated signals, as shown in a block 740. The method 700 then operates by generating a multi-channel modulation waveform based on the plurality of modulated signals, as shown in a block 750. The method 700 continues by operating at least one communication interface of the communication device to support communication with the at least one additional communication device via at least one of the plurality of channels, as shown in a block 760.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction with software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   a parser configured to process an input signal that includes a plurality of input bits or bytes to generate a plurality of parsed groups of the plurality of input bits or bytes;
   a plurality of outer encoders configured to process the plurality of parsed groups of the plurality of input bits or bytes to generate a plurality of coded signals, wherein a first and a second of the plurality of coded signals are generated by a first and a second of the plurality of outer encoders;
   an inner encoder configured to process at least a subset of the plurality of coded signals to generate at least one codeword, wherein the subset of the plurality of coded signals is selected based on a duration of a burst noise event associated with at least one of a plurality of communication channels that couple the apparatus with at least one additional apparatus;
   a plurality of interleavers configured to process the at least one codeword to generate a plurality of interleaved signals;
   a plurality of symbol mappers or modulators configured to process the plurality of interleaved signals to generate a plurality of modulated signals; and a communication interface configured to:
  generate a multi-channel modulation waveform based on the plurality of modulated signals; and
  support communication with the at least one additional apparatus via at least one of the plurality of communication channels.

2. The apparatus of claim 1, wherein the inner encoder is further configured to:
  process a first subset of the plurality of coded signals to generate a first codeword; and
  process a second subset of at least two the plurality of coded signals to generate a second codeword.

3. The apparatus of claim 1 further comprising:
  the plurality of outer encoders configured to employ at least one of Reed-Solomon (RS) coding, BCH (Bose and Ray-Chaudhuri, and Hocquenghem) coding, and turbo coding; and
  the inner encoder configured to employ a low density parity check (LDPC) code.

4. The apparatus of claim 1, wherein the plurality of communication channels correspond to a plurality of orthogonal signal elements of an orthogonal signaling scheme corresponding to at least one of orthogonal frequency division multiple access (OFDMA) signaling and code division multiple access (CDMA) signaling.

5. The apparatus of claim 1 further comprising:
  a communication device that is operative within at least one of a satellite communication system, a wireless communication system, a wired communication system, a fiber-optic communication system, and a mobile communication system.

6. An apparatus comprising:
  a parser configured to process an input signal that includes a plurality of input bits or bytes to generate a plurality of parsed groups of the plurality of input bits or bytes;
  a plurality of outer encoders configured to process the plurality of parsed groups of the plurality of input bits or bytes to generate a plurality of coded signals, wherein a first and a second of the plurality of coded signals are generated by a first and a second of the plurality of outer encoders;
  an inner encoder configured to process the plurality of coded signals to generate at least one codeword;
  a plurality of symbol mappers or modulators configured to process the at least one codeword to generate a plurality of modulated signals; and
  a communication interface configured to generate a multi-channel modulation waveform based on the plurality of modulated signals.

7. The apparatus of claim 6, wherein the inner encoder is further configured to:
  process a first subset of the plurality of coded signals to generate a first codeword; and
  process a second subset of at least two the plurality of coded signals to generate a second codeword.

8. The apparatus of claim 6, wherein the inner encoder is further configured to:
  process a subset of the plurality of coded signals to generate the at least one codeword, wherein the subset of the plurality of coded signals is selected based on a duration of a burst noise event associated with at least one communication channel of a plurality of communication channels that couple the apparatus with at least one additional apparatus.

9. The apparatus of claim 6 further comprising:
  a plurality of interleavers, interposed between the inner encoder and the plurality of symbol mappers or modulators, configured to process the at least one codeword before the plurality of symbol mappers or modulators process the at least one codeword to generate the plurality of modulated signals, wherein:
  a first of the plurality of interleavers is interposed between the inner encoder and a first of the plurality of symbol mappers or modulators; and
  a second of the plurality of interleavers is interposed between the inner encoder and a second of the plurality of symbol mappers or modulators.

10. The apparatus of claim 6 further comprising:
  the plurality of outer encoders configured to employ at least one of Reed-Solomon (RS) coding, BCH (Bose and Ray-Chaudhuri, and Hocquenghem) coding, and turbo coding; and
  the inner encoder configured to employ a low density parity check (LDPC) code.

11. The apparatus of claim 6 further comprising:
  the communication interface configured to support communication with at least one additional apparatus via a plurality of communication channels, wherein the plurality of communication channels correspond to a plurality of orthogonal signal elements of an orthogonal signaling scheme corresponding to at least one of orthogonal frequency division multiple access (OFDMA) signaling and code division multiple access (CDMA) signaling.

12. The apparatus of claim 6 further comprising:
  the communication interface configured to support communication with at least one additional apparatus via a plurality of communication channels, wherein the plurality of communication channels correspond to a plurality of physical communication channels between the apparatus and the at least one additional apparatus.

13. The apparatus of claim 6 further comprising:
  a communication device that is operative within at least one of a satellite communication system, a wireless communication system, a wired communication system, a fiber-optic communication system, and a mobile communication system.

14. A method for execution by a communication device, the method comprising:
  parsing an input signal that includes a plurality of input bits or bytes to generate a plurality of parsed groups of the plurality of input bits or bytes;
  operating a plurality of outer encoders to process a plurality of parsed groups of the plurality of input bits or bytes to generate a plurality of coded signals, wherein a first and a second of the plurality of coded signals generated by a first and a second of the plurality of outer encoders;
  operating an inner encoder to process the plurality of coded signals to generate at least one codeword;
  symbol mapping or modulating the at least one codeword to generate a plurality of modulated signals;
  generating a multi-channel modulation waveform based on the plurality of modulated signals; and
  supporting communication with at least one additional communication device using a communication interface of the communication device via at least one of a plurality of communication channels that couple the communication device with the at least one additional device.

15. The method of claim 14 further comprising:
  processing a first subset of the plurality of coded signals to generate a first codeword; and
  processing a second subset of at least two the plurality of coded signals to generate a second codeword.

16. The method of claim 14 further comprising:
processing a subset of the plurality of coded signals to generate the at least one codeword, wherein the subset of the plurality of coded signals selected based on a duration of a burst noise event associated with the at least one communication channel of the plurality of communication channels that couple the communication device with at least one additional communication device.

17. The method of claim 14 further comprising:
operating a plurality of interleavers, interposed between the inner encoder and the plurality of symbol mappers or modulators, to process the at least one codeword before the plurality of symbol mappers or modulators process the at least one codeword to generate the plurality of modulated signals, wherein:
a first of the plurality of interleavers is interposed between the inner encoder and a first of the plurality of symbol mappers or modulators; and
a second of the plurality of interleavers is interposed between the inner encoder and a second of the plurality of symbol mappers or modulators.

18. The method of claim 14 further comprising:
operating the plurality of outer encoders by employing at least one of Reed-Solomon (RS) coding, BCH (Bose and Ray-Chaudhuri, and Hocquenghem) coding, and turbo coding; and
operating the inner encoder by employing a low density parity check (LDPC) code.

19. The method of claim 14, wherein the plurality of communication channels correspond to a plurality of orthogonal signal elements of an orthogonal signaling scheme corresponding to at least one of orthogonal frequency division multiple access (OFDMA) signaling and code division multiple access (CDMA) signaling.

20. The method of claim 14, wherein the communication device is operative within at least one of a satellite communication system, a wireless communication system, a wired communication system, a fiber-optic communication system, and a mobile communication system.

* * * * *